United States Patent [19]
Boutin

[11] Patent Number: 5,911,286
[45] Date of Patent: Jun. 15, 1999

[54] INDEPENDENT SUSPENSION AND HALFSHAFT ASSEMBLY WITH DOUBLE CROWN SPLINE JOINT

[76] Inventor: Robert Boutin, P.O. Box 674, Birmingham, Mich. 48012

[21] Appl. No.: 08/873,422

[22] Filed: Jun. 12, 1997

[51] Int. Cl.⁶ .............................. G60K 17/00; B60G 3/00
[52] U.S. Cl. ......................... 180/359; 180/348; 180/384; 280/124.156; 464/158
[58] Field of Search ..................................... 180/348, 358, 180/359, 353, 376, 379, 383, 384, 385, 256, 260, 258; 280/124.111, 124.134, 124.135, 124.156; 464/158, 159

[56] References Cited

U.S. PATENT DOCUMENTS

| | | | |
|---|---|---|---|
| 1,282,598 | 10/1918 | Lamb | 180/258 |
| 3,292,390 | 12/1966 | Wildhaber | 464/158 |
| 3,359,757 | 12/1967 | Adams | 464/159 |
| 3,360,068 | 12/1967 | Behles | 180/358 |
| 3,476,200 | 11/1969 | Schoepe et al. | 180/256 |
| 3,983,951 | 10/1976 | Guerra | 180/256 |
| 4,511,346 | 4/1985 | Hazebrook et al. | |
| 4,632,203 | 12/1986 | Krude. | |
| 4,669,571 | 6/1987 | Krude | 180/348 |
| 4,819,756 | 4/1989 | Krude. | |
| 4,824,418 | 4/1989 | Taubert | 464/159 |
| 4,832,657 | 5/1989 | Hahn. | |
| 4,913,681 | 4/1990 | Green | 464/159 |
| 5,167,584 | 12/1992 | Krude. | |
| 5,290,203 | 3/1994 | Krude. | |

FOREIGN PATENT DOCUMENTS 294 762 A5  10/1991  Germany.
351648  7/1931  United Kingdom.

OTHER PUBLICATIONS

Honda ATV, Service Manual, p. 13–0.

*Primary Examiner*—Peter C. English
*Attorney, Agent, or Firm*—Mick A. Nylander

[57] ABSTRACT

An independent suspension and rear halfshaft assembly for a vehicle having at least one wheel, a frame and at least one source of torque transmission, comprising at least one rigid arm hingedly connected to the frame and connected to the wheel, a Cardan type universal joint operatively connected to the source of torque transmission and having a pivot point approximately collinear with the pivot axis of the rigid arm, a rigid axle shaft operatively connected to the Cardan type universal joint and a crown spline joint operatively connecting the rigid axle shaft and the wheel.

5 Claims, 3 Drawing Sheets

INDEPENDENT SUSPENSION AND HALFSHAFT ASSEMBLY WITH DOUBLE CROWN SPLINE JOINT

FIELD OF THE INVENTION

The present invention relates to halfshaft assemblies for transmitting torque to the wheels of a vehicle, particularly for electric vehicles and ATV (all terrain vehicles) utilizing swing-axle type independent rear suspensions.

BACKGROUND OF THE INVENTION

The present invention involves transmitting torque to the rear wheels of a vehicle with an independent suspension. It has long been known to transmit torque from an engine transmission to a wheel through the use of joints and drive shafts. Independent suspensions require separate axles (or halfshafts) for each wheel, so that each wheel may travel independently of the other wheel. Thus, for example, if one wheel falls into a deep hole or rut, the other wheel is not lifted from the driving surface as may happen with a single axle suspension.

In driving independently suspended wheels, it has previously been considered essential to maintain the vertical alignment of the wheels of the vehicle during vertical displacement, commonly referred to as jounce and rebound. Thus, wheel joints have typically required sophisticated torque transfer mechanisms which allow a great deal (greater than 10°) of angular excursion relative to the halfshaft to maintain the vertical alignment of the wheel during full jounce and rebound. This, and other variations in the physical relationship between the drive axle and the wheel have led to sophisticated joints and torque transfer mechanisms, such as constant velocity fixed joints which permit angular excursion of over 40°, or constant velocity plunging joints which permit angular excursion over 24° and axial travel (plunging) over 50 mm, e.g. U.S. Pat. No. 4,511,346 to Hazebrook, et al.; U.S. Pat. No. 4,632,203 to Krude; U.S. Pat. No. 4,832,657 to Hahn; U.S. Pat. No. 5,167,584 to Krude; and U.S. Pat. No. 5,290,203 to Krude, which are incorporated by reference herein.

With respect to propeller shafts, it has also been known to utilize a rounded spline within a splined sleeve as a joint to transfer torque between aligned shafts where minimal angular excursion or axial travel is generated, such as U.S. Pat. No. 4,824,418 to Taubert, and U.S. Pat. No. 4,913,681 to Green. While these joints are inexpensive to make, their use is heretofore restricted to drive shafts where the components are fixed and aligned, rather than for use in halfshaft assemblies. An example of such a use is in the Honda ATV (Four Trax), which provides a single swing suspension for both rear wheels, and utilizes a crown spline joint on the rear propeller shaft.

Further, Cardan joints, also referred to as Hooke's universal joints, have long been known to provide for the transfer of torque between axles while permitting an angle between shafts of up to 30°. Such joints have typically only been used in connection with axially fixed components or in conjunction with plunging joints which compensate for axial travel, as the interconnecting pin arrangement of a Cardan joint is susceptible to fatigue from axial loading (See e.g. U.S. Pat. Nos. 4,669,571 and 4,819,756, incorporated by reference herein). These patents detail the limitations of the Cardan joint and illustrate the use of constant velocity universal joints with a hinge type independent suspension.

In spite of these varied and sophisticated drive systems and joints, there is no known assembly which permits the use of a crowned spline joint at the wheel and a Cardan joint at the transmission output in a halfshaft assembly for an independently suspended wheel.

OBJECTS AND SUMMARY OF THE INVENTION

It is an object of the present invention to provide a simple and inexpensive halfshaft assembly which transmits torque from a transmission output to a vehicle wheel.

It is a further object to provide a halfshaft assembly which utilizes a Cardan joint at the output shaft from the transmission and utilizes a crown joint at the wheel.

It is an object of the present invention to provide a halfshaft assembly wherein the angular excursion and plunge experienced at the joint between the wheel and drive shaft is held within the tolerance of a crown joint.

The present invention achieves these objectives through the combination of a splined crown joint at the wheel which permits a small amount of plunge and angular excursion, a rigid drive axle, a Cardan joint at the transmission output which permits angular excursion, and an independent swing axle suspension including control arms which essentially fixes the axial distance and alignment between the splined crown joint and Cardan joint, and maintains the nominal angle between the wheel and the axle.

DETAILED DESCRIPTION OF PREFERRED EMBODIMENTS

Figure 1:
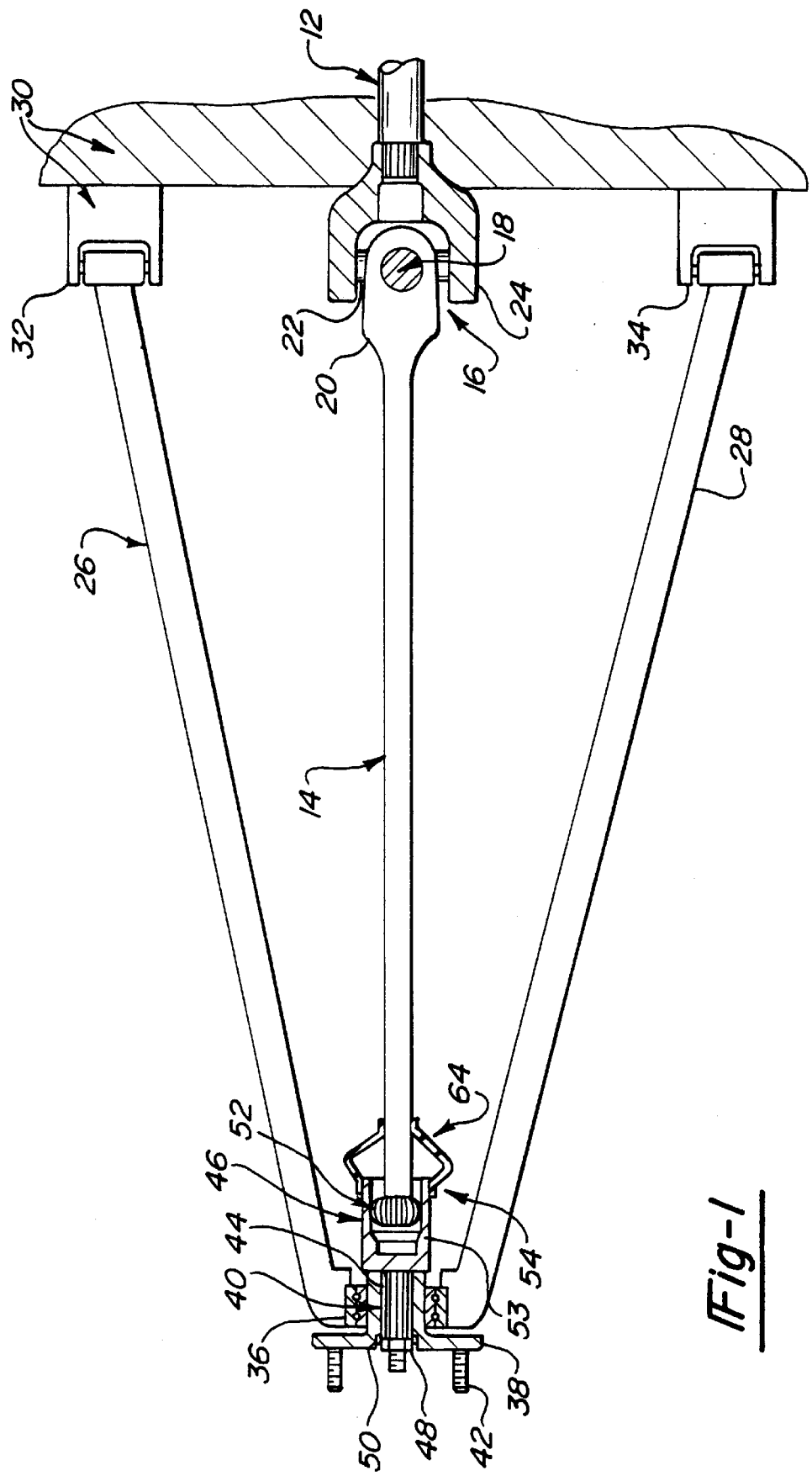
FIG. 1 is a top view of an assembly according to the present invention.

The present invention is a drive axle assembly shown in FIG. 1. Torque is transmitted from the output shaft 12 of the transmission of a vehicle (not shown). The torque is transferred from the output shaft 12 to the axle shaft 14 through a universal joint 16, commonly referred to as a Cardan joint or a Hooke's type joint. The universal joint 16 includes a pair of pins 18 and 22 pivotally held within brackets 20 and 24, which permit pivotal movement about each pin axis, permitting an angle between the shafts 12 and 14 up to approximately 30°. Although a Cardan joint is shown in the preferred embodiment, it should be appreciated that other more expensive joints can provide the required angular excursion.

The shaft 14 is held in line by control arms 26 and 28 which are pivotally connected to the vehicle frame 30 at hinges 32 and 34 whose axes are coplanar and preferably collinear. It is further preferred that the pivot point of the universal joint 16 lie within the plane of the hinges 32 and 34 or upon the axis thereof.

The control arms 26 and 28 are connected to a collar 36 containing bearings, within which the wheel hub 38 may rotate. The wheel (not shown) is attached to the wheel hub 38 through a plurality of wheel bolts 42. The wheel hub 38 is installed over splined portion 40 upon the axial outer portion of the wheel hub stem 44 and fastened with a nut 48 or other threaded fastener. The threaded portion of the wheel hub stem 44 may further be provided with a bore through its center (perpendicular to its axis) axially outside the location of the nut 48 when in its tightened position shown, permitting the use of a locking pin (not shown). The wheel hub 38 may also have an increased internal diameter at its axially outer end to create a shoulder 50 to receive the nut 48.

Figure 2:
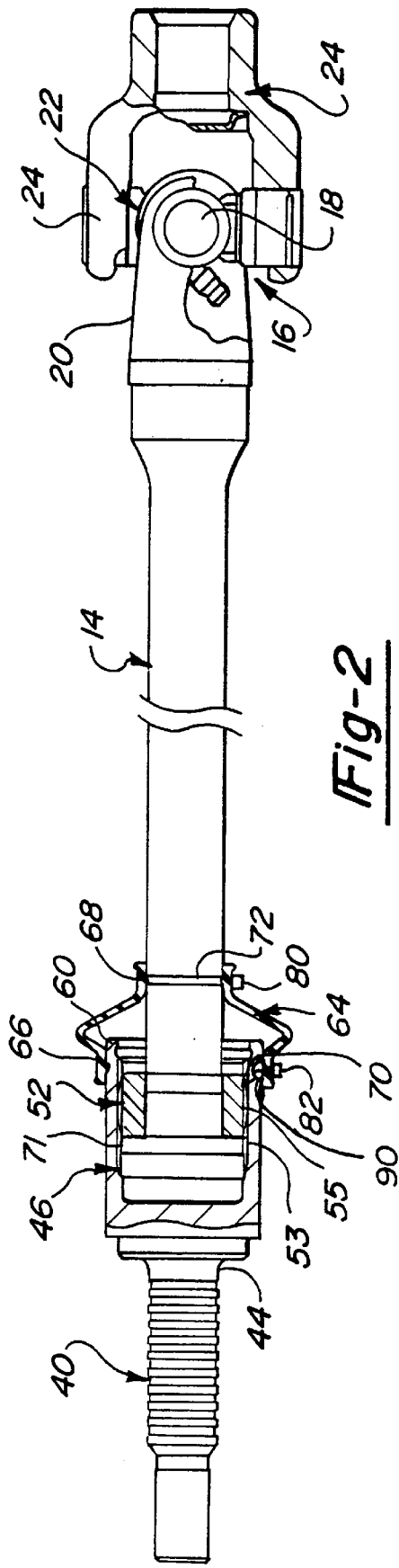
FIG. 2 is a top view of the drive axle assembly of FIG. 1.

As shown in the FIGS. 1 and 2, the drive sleeve 46 receives a crown spline 52 to form the joint 54 for transmitting the torque from the axle shaft 14 to the wheel hub 38. The axial length of the inner splined surface 53 of the drive sleeve 46 is greater than the axial length of the outer race or mating splined surface 55 of the crown spline 52, to permit relative axial movement (plunge) between the drive sleeve 46 and crown spline 52 while maintaining spline contact. Although the difference in axial length can be increased to allow for substantial plunge, the preferred difference is at least about 8 mm, to allow a tolerance of ±4 mm. Too great a difference will adversely effect the angular excursion tolerance discussed below. This allowance for plunge accommodates vehicle build tolerances, flexing of the suspension and vehicle frame during vehicle operation, misalignments and other such common sources of small dimensional and structural variations. Because the axial distance between the wheel hub 38 and the vehicle frame 30 is substantially fixed by the control arms 26 and 28, only a small tolerance or allowance for plunge is required, nominally ±1 mm.

Figure 3C:
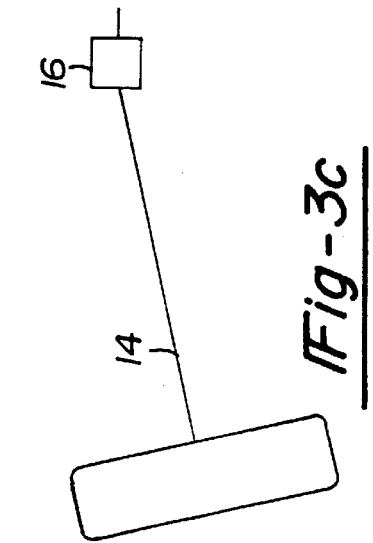
FIG. 3c is a diagrammatical view of the system of FIGS. 3a and 3b with the wheel at full rebound position.
Figure 3B:
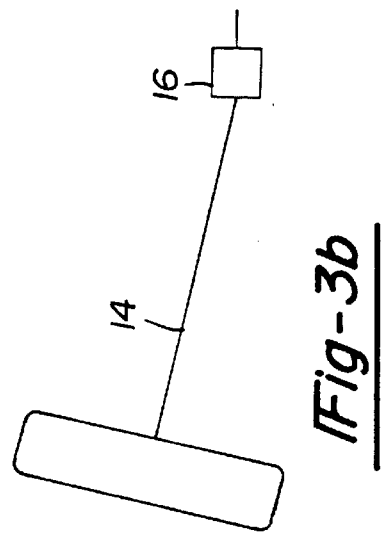
FIG. 3b is a diagrammatical view of the system of FIG. 3a with the wheel at full jounce position.
Figure 3A:
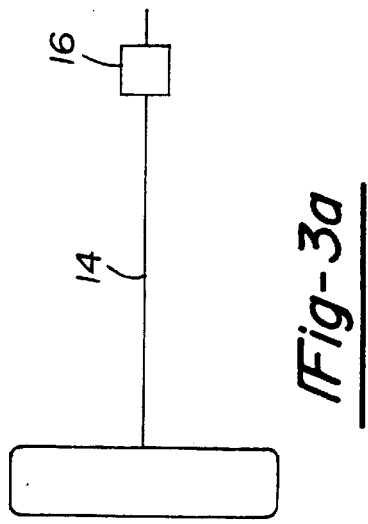
FIG. 3a is a diagrammatical view of a wheel, axle and joint according to the present invention in its nominal condition.

The above stated dimensional and structural variations also require some tolerance for angular excursion at the joint 54. As described above, the universal joint 16 permits a 30° angular excursion, which is restricted by the control arms 26 and 28 to a rotational motion about the axis of the hinges 32 and 34. This allows the wheel to jounce and rebound as shown in FIG. 3a (nominal), 3b (full jounce) and 3c (full rebound). However, the wheel will remain in the same position relative to the axle shaft 14, nominally a 90° angle. Thus, only a smaller amount of angular excursion is required at joint 54 because the relationship between the hub 38 and the axle shaft 14 is substantially fixed by the control arms 26 and 28. This will yield a somewhat pendular motion of the wheel between jounce and rebound rather than a purely vertical motion; this is acceptable within this application, and particularly so for certain low performance vehicles such as electric vehicles or golf carts.

Figure 5A:
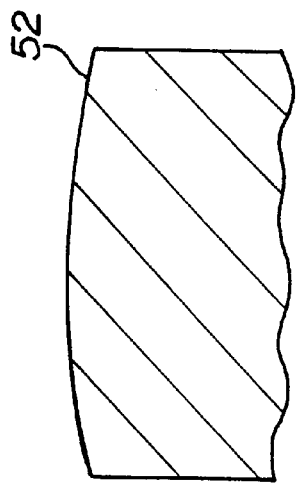
FIG. 5a is a partial cross sectional view of a crown spline.
Figure 5B:
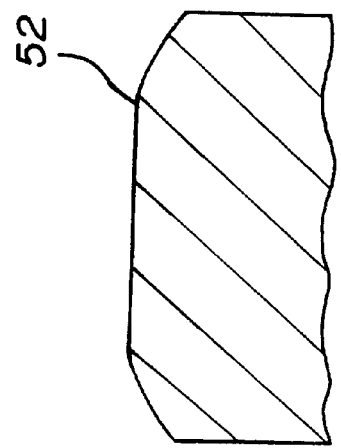
FIG. 5b is a partial cross sectional view of a double crown spline.
Figure 4:
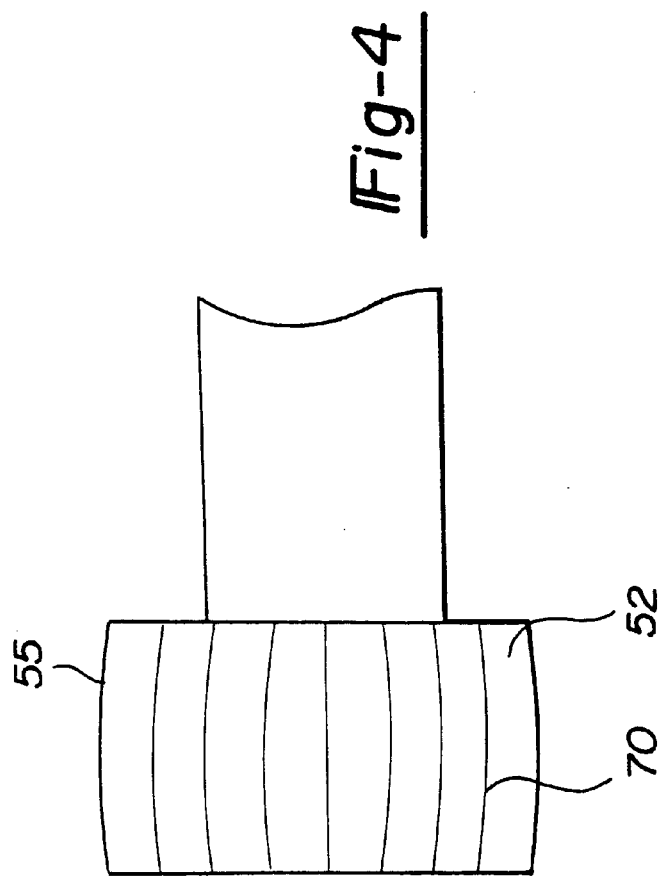
FIG. 4 is a side view of the crown spline of the present invention.

Referring now to FIGS. 2 and 4 the crowned spline 52 has a plurality of drive splines 70 spaced about its circumference. Each drive spline 70 is curved at its axial ends to permit relative angular motion between the axle shaft 14 and the drive sleeve 46. The nature of the drive spline curvature (profile) can be a continuous curve of a constant radius as shown in FIG. 5a or other configuration. The preferred profile may be referred to as a double crown, where the central portion of the drive spline profile is flat (parallel to the drive shaft axis) or more slightly curved (higher radius curve) to maximize surface engagement of the drive splines in the nominal aligned position as shown in FIG. 5b. The axial edges of the drive splines are more curved (lower radius curve) to allow the angular travel, although the amount of surface engagement between the drive splines 70 and the splines 71 of the drive sleeve 46 will be slightly reduced in this alignment due to the engagement of curved portions of the drive splines. An angular excursion of 0.5° to 5° degrees is preferred in the crown spline joint. An improved spline engagement may alternatively be obtained by forming the splines on the male member 52 to converge at each of their axial ends, similar to the lines of longitude converging at the north and south poles.

In an alternate embodiment not shown, the drive sleeve 46 and the crown spline 52 may be juxtapositioned. The drive sleeve 46 would be integrally formed with the drive axle 14, and receive the crown spline 52 which would be integrally formed with the wheel hub stem 44 and attached to the wheel hub 38. In this embodiment, the splines 71 of the drive sleeve 46 would be the driving splines, and the drive splines 70 of the crown spline 52 would be the driven splines; but these driven splines would bear the curvature described above.

The axle 14, crown spline 52, drive sleeve 46 and wheel hub stem 44 may be integrally formed in the combinations described in the two embodiments using known forming techniques such as cold-forming and rack rolling to form external splines, with a minimum of additional machining. This provides an inexpensive and yet strong and durable joint.

The joint 54 can be sealed through a plurality of sealing means, which may be combined, and the joint may be filled with grease to minimize the entry of foreign particles between the splines. A first sealing member (not shown) may be spaced axially inwardly of the crown spline 52. The seal may be a single annular member, such as an o-ring of slightly larger outer diameter than the inner diameter of the drive sleeve to create a compression fit. Similarly, the seal may have a smaller inner diameter than the diameter of the drive axle 14. The seal may be formed of any suitable elastomeric material, such as rubber, vinyls or a thermoplastic elastomer. A seating groove may be provided in the drive sleeve to seat the seal during axial movement between the axle 14 and drive sleeve 46. Alternatively, the seal could be fixed relative to the drive axle 14, in a seating groove or by other means. In this arrangement a seal having a pair of flexible annular lips is preferred to create the slidable seal against the inner surface of the drive sleeve 46. The seal must be flexible enough to compress during any angular excursion permitted by the joint 54 while maintaining the sealing engagement between the drive axle 14 and the drive sleeve 46.

As shown in FIGS. 1 and 2, in the preferred embodiment, an additional seal, a boot 64, is provided. Such boots are known in the art, and are made of suitable elastomeric material such as rubber, vinyl or a thermoplastic elastomer. The boot 64 is allowed to flex and extend or contract in response to relative axial movement. The boot 64 has annular ribs 66 and 68 which are seated in mating grooves 90 and 72 to restrict axial movement of the boot 64. The boot 64 encompasses and isolates the environment of the joint 54, while permitting the necessary angular excursion and plunge. Preferably, metal band clamps 80 and 82 would be used to secure the boot 64 to the drive axle 14 and the drive sleeve 46. An example of a preferred boot configuration is shown in U.S. Pat. No. 4,795,404, incorporated by reference herein.

An annular metal clip 60, which seats within an annular groove in the drive sleeve 46 may also be provided to restrict removal of the axle shaft 14 from the drive sleeve 46 during shipping, storing or installation.

Other objects, features and advantages of the present invention will become apparent from the subsequent description and the appended claims, taken in conjunction with the accompanying drawings.

What is claimed is:

1. An independent suspension and rear halfshaft assembly for a vehicle having at least one wheel, a frame and at least one source of torque transmission, comprising:

a pair of rigid arms hingedly connected to said frame and connected to said wheel, each of said rigid arms having a pivot axis;

a Cardan universal joint operatively connected to said source of torque transmission and having a pivot point approximately collinear and coplanar with each of said pivot axes of said rigid arms;

a rigid axle shaft operatively connected to said Cardan universal joint; and a crown spline joint operatively connecting said rigid axle shaft and said wheel, said crown spline joint having a drive sleeve having an inner splined surface, and a crown spline having a splined surface adapted for mating with said inner splined surface of said drive sleeve wherein said crown spline joint allows for at least 8 mm plunge between said crown spline and said drive sleeve and said crown spline joint further allows for an angular excursion in a range from 0.5 to 5°.

2. An independent suspension and rear halfshaft assembly for a vehicle having at least one wheel, a frame and at least one source of torque transmission, comprising:

a pair of rigid arms hingedly connected to said frame and connected to said wheel, each of said rigid arms having a pivot axis;

a universal joint having a range of angular excursion of at least about 10° operatively connected to said source of torque transmission and having a pivot point approximately collinear and coplanar with each of said pivot axes of said rigid arms;

a rigid axle shaft operatively connected to said universal joint; and a crown spline joint operatively connecting said rigid axle shaft and said wheel.

3. An independent suspension and rear halfshaft assembly as in claim 2 wherein said crown spline joint comprises:

a drive sleeve having an inner splined surface; and a crown spline having a splined surface adapted for mating with said inner splined surface of said drive sleeve.

4. An independent suspension and rear halfshaft assembly as in claim 3 wherein said crown spline joint allows for at least an 8 mm plunge between said crown spline and said drive sleeve.

5. An independent suspension and rear halfshaft assembly as in claim 3 wherein said crown spline joint allows for an angular excursion in a range from 0.5° to 5°.

* * * * *

UNITED STATES PATENT AND TRADEMARK OFFICE
CERTIFICATE OF CORRECTION

PATENT : 5,911,286
DATED : Jun. 15, 1999
INVENTOR(S) : Boutin

It is certified that error appears in the above-identified patent and that said Letters Patent is hereby corrected as shown below:

On the title page, insert the following:

Item [73] Assignee: GKN Automotive, Inc.
                      Auburn Hills, Michigan 48326-2362

Signed and Sealed this

First Day of February, 2000

*Attest:*

Q. TODD DICKINSON

*Attesting Officer*        *Acting Commissioner of Patents and Trademarks*